United States Patent [19]

De Cat et al.

[11] 4,017,473
[45] Apr. 12, 1977

[54] HARDENING OF PROTEINACEOUS MATERIALS

[75] Inventors: Arthur Henri De Cat, Mortsel; Valere Frans Danckaert, Boechout; Francis Jeanne Sels, Kontich; Robert Joseph Pollet, Vremde, all of Belgium

[73] Assignee: AGFA-GEVAERT N.V., Mortsel, Belgium

[22] Filed: May 20, 1975

[21] Appl. No.: 579,251

[30] Foreign Application Priority Data

May 24, 1974 United Kingdom ............. 23409/74

[52] U.S. Cl. .............................. 260/117; 96/111; 260/112 R
[51] Int. Cl.[2] .......................... C09H 11/00
[58] Field of Search .......... 96/111; 260/117, 112 R

[56] References Cited
UNITED STATES PATENTS 3,091,537   5/1963   Burness .................. 96/111
3,189,459   6/1965   Burness .................. 260/117

*Primary Examiner*—Melvyn I. Marquis
*Attorney, Agent, or Firm*—William J. Daniel

[57] ABSTRACT

Proteinaceous materials, especially gelatin, are hardened by incorporating therein at least one bis-epoxy compound corresponding to one of the formula:

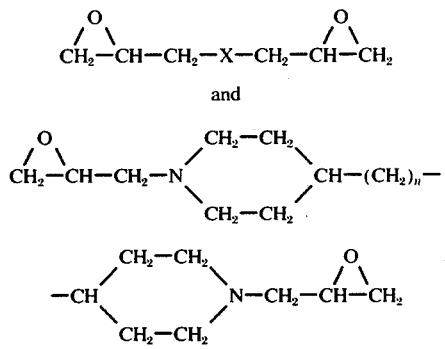

wherein:
X represents a 1,4-piperazinylene group or a monomethyl or dimethyl-substituted 1,4-piperazinylene group, or represents a 1,2-pyrazolidinylene group, and $n$ is 0 or an integer from 1 to 4.

The proteinaceous material, especially the gelatin, is subsequently applied to form a photographic silver halide emulsion layer, a backing layer, a protective layer, a filter layer or any other photographic auxiliary layer.

3 Claims, No Drawings

HARDENING OF PROTEINACEOUS MATERIALS

This invention relates to a process for the hardening of proteinaceous materials, in particular of gelatin. The invention is of particular importance for hardening such materials, when used as binder in photographic layers, more especially as binder for light-sensitive silver halide emulsion layers. The invention also relates to proteinaceous materials hardened by such process.

Various agents have been employed for hardening gelatin or other polymers that are used as binder in silver halide photographic emulsions. There can be mentioned: formaldehyde, chrome salts, dialdehydes, hydroxy aldehydes, chlorides of dibasic organic acids and dianhydrides of tetracarboxylic acids. Most of these compounds exhibit disadvantages such as being photographically active, or often causing a fogging of the emulsions on prolonged storage. Others are responsible for a decrease of the sensitivity of the photographic emulsion. Anhydrides and acid chlorides lower the pH value of the emulsion layer, thus requiring a readjustment with alkali. Furthermore, the viscosity of the coating composition is in many cases raised to an alarming degree. Other hardening agents have the disadvantage of becoming only operative after a prolonged storage time, whereas others such as formaldehyde are volatile so that an exact dosage of the quantities added is practically impossible.

It is among the objects of the present invention to provide novel hardening agents for proteinaceous materials, in particular gelatin, and gelatin silver halide emulsion layers, whereby these layers can be given improved chemical and photographic properties.

According to the invention a process for hardening proteinaceous materials is provided, which comprises incorporating in the proteinaceous material a bis-epoxy compound corresponding to one of the formulae:

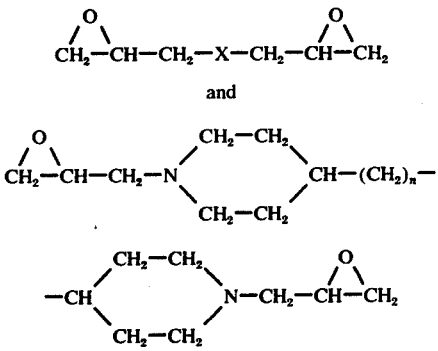

wherein
X represents a 1,4-piperazinylene group or a monomethyl- or dimethyl-substituted 1,4-piperazinylene group, or represents a 1,2-pyrazolidinylene group, and $n$ is 0 or an integer from 1 to 4.

The invention includes any composition of matter containing proteinaceous material together with a said bis-epoxy compound or consisting of or comprising a proteinaceous material hardened by a process as above defined.

Bis-epoxy compounds corresponding to the above formulae can be obtained starting with the condensation of two moles of epichlorohydrin with one mole of the selected diamine, the reaction preferably being carried out in an inert solvent. The bis-chlorohydrin produced by the condensation reaction is readily convertible to the desired bis-epoxy compound by treating the bis-chlorohydrin with aqueous alkali at about room temperature.

The bis-epoxy compounds can be used with advantage in photographic silver halide gelatin emulsion layers. Such compounds are also useful in backing layers, protective layers, filter layers, and other auxiliary layers which contain gelatin or other proteins. The swelling and solubility characteristics of the proteinaceous material, e.g. gelatin, can be reduced to any desired degree by the hardening process described. The proportion of bis-epoxy compound with respect to the proteinaceous material can be selected according to the results required. For most purposes good results can be obtained by using 20–200g of hardening agent per kg of proteinaceous material. A further advantage is that the proteinaceous material does not become brittle. In this respect the specified bis-epoxy compounds are superior to functional hardening agents, which cause a three-dimensional cross-linking that inherently results in more brittle layers. Layers comprising proteinaceous material hardened by a process according to the invention, even in swelled condition, show a good abrasion-resistance and a relatively low degree of swelling. An after-hardening reaction does not occur usually, so that the maximum degree of hardening is reached within a few days.

A great advantage of the hardening agents used according to this invention resides in the feature that they do not react under normal conditions with colour couplers as used in colour photographic materials, e.g., multilayer materials. Consequently such hardening agents can be incorporated in colour photographic materials in which non-diffusing colour couplers are present.

Proteinaceous materials in which a said bis-epoxy compound is present have improved adhesion to substrates or underlying coating layer (if any). Thus, for example, the said compounds can serve to improve the adhesion of the several superimposed layers in multilayer materials. The danger of layer separation in the wet state during processing and drying of multilayer photographic materials can thus be reduced.

The hardening agents may be added to photographic layers in the form of a solution of a suitable water-miscible organic solvent, such as methanol, ethanol, acetone, dioxan, or dimethyl formamide, prior to coating. The viscosity of the coating solution is not raised. The amounts of hardening agents added depend on the desired effect. In general 20–200g of hardening agent per kg of layer colloid such as gelatin are sufficient. In this way, layers with a high melting point are obtained.

Although in the foregoing we have described hardening gelatin or other proteins by means of the bis-epoxy compounds described above, it should be noted that these bis-epoxy compounds may also be used for hardening polymers comprising free carboxyl groups, e.g. cellulose derivatives comprising free carboxyl groups such as cellulose acetate phthalate, synthetic polymers such as copolymers of styrene and maleic acid or (meth)acrylic acid, copolymers of vinyl acetate and crotonic acid or (meth)acrylic acid, copolymers of alkyl (meth)acrylate and (meth)acrylic acid and the like. Such other uses of a said bis-epoxy compound is also within the scope of the invention.

The following example illustrates the invention.

EXAMPLE

A highly sensitive silver bromide iodide emulsion containing 6% of iodide and a total silver content expressed in silver nitrate of 150 g/kg as well as a gelatin content of 150 g/kg is sensitized optically in the usual way and provided with the colour coupler that corresponds with this optical sensitizer, as is usual in colour photography. After addition of the usual stabilizing and wetting solutions 3 g of 1,4-bis(2′,3′-epoxypropyl)-piperazine, i.e. 2% by weight in respect of the total gelatin content are added per kg of emulsion for hardening purposes. The addition of this hardening agent does not alter the viscosity of the emulsion.

The mixture is coated on a film support at a ratio of 1.5 to 2 g of silver nitrate per sq.m. After the usual drying and after storage for 48 hours at 57° C, the layer appears to have a melting point higher than 90° C. The photographic properties of the emulsion are not changed. Whereas conventionally hardened photographic emulsion layers appear to be tacky and swelled, the layers hardened according to the process of this example, have excellent properties and show a very good abrasion-resistance.

The same good results are obtained when in the above coating composition the 1,4-bis(2′,3′-epoxypropyl)-piperazine is replaced by 1,3-bis[1′(2″,3″-epoxypropyl)-piperidinyl(4′)]-propane.

We claim:

1. A process for hardening a thin layer of proteinaceous material, which comprises incorporating in the proteinaceous material at least one bis-epoxy compound corresponding to one of the formulae:

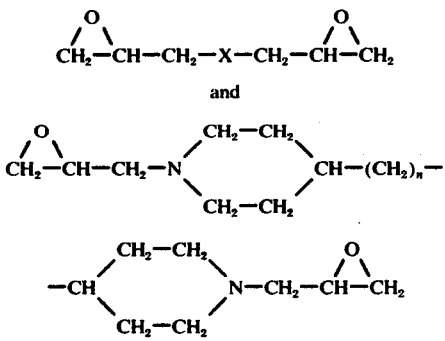

wherein:
X represents a 1,4-piperazinylene group or a monomethyl- or dimethyl-substituted 1,4-piperazinylene group, or represents a 1,2-pyrazolidinylene group, and $n$ is 0 or an integer from 1 to 4.

2. A process according to claim 1, wherein the proteinaceous material is gelatin.

3. A process according to claim 1, wherein the bis-epoxy compound is 1,4-bis(2′,3′-epoxypropyl)-piperazine.

* * * * *